(12) United States Patent
Savage et al.

(10) Patent No.: US 7,121,571 B2
(45) Date of Patent: Oct. 17, 2006

(54) HEEL REST FOR A MOTORCYCLE

(75) Inventors: Frank Savage, Trenton, WI (US); Chris Fecke, Milwaukee, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/040,082

(22) Filed: Jan. 21, 2005

(65) Prior Publication Data

US 2006/0163839 A1 Jul. 27, 2006

(51) Int. Cl.
*B62J 25/00* (2006.01)

(52) U.S. Cl. .................. 280/291; 280/163; 280/164.1; 180/219; 296/75; 74/564

(58) Field of Classification Search ................ 280/291, 280/304.3, 163, 164.1; 180/90.1, 219; 296/75; 74/563, 564
See application file for complete search history.

(56) References Cited

U.S. PATENT DOCUMENTS

| | | | | | |
|---|---|---|---|---|---|
| 4,023,821 | A | * | 5/1977 | Eiland | 280/291 |
| 4,984,838 | A | * | 1/1991 | Kim | 296/75 |
| 6,179,313 | B1 | * | 1/2001 | Christensen | 180/219 |
| D478,848 | S | * | 8/2003 | Rice | D12/114 |
| 6,626,448 | B1 | * | 9/2003 | Miles | 280/291 |
| 6,916,034 | B1 | * | 7/2005 | Elliott | 280/291 |
| 2003/0209876 | A1 | * | 11/2003 | Elliott | 280/291 |

* cited by examiner

*Primary Examiner*—Lesley D. Morris
*Assistant Examiner*—Marc A. Scharich
(74) *Attorney, Agent, or Firm*—Michael Best & Friedrich LLP

(57) ABSTRACT

A heel rest for a motorcycle having an exhaust pipe. The heel rest including a mounting base adapted to connect to the exhaust pipe and a heel pad coupled to the mounting base. The heel rest also includes an insulating member disposed between the heel pad and the mounting base to inhibit heat transfer between the heel pad and the mounting base.

22 Claims, 3 Drawing Sheets

HEEL REST FOR A MOTORCYCLE

BACKGROUND

The present invention relates to a heel rest for a motorcycle. More particularly, the invention relates to a motorcycle heel rest that is mounted directly to a motorcycle exhaust pipe.

Motorcycles generally include a front wheel and a rear wheel that rotate about separate axles as the motorcycle moves. An engine combusts a fuel-air mixture to produce shaft power that is directed to the rear wheel to propel the motorcycle. As a byproduct of the combustion process, the engine also produces a flow of products of combustion. The products of combustion are typically exhausted from the engine through an exhaust system, which commonly includes one or more exhaust pipes that are positioned on one or both sides of the motorcycle and extend toward the rear of the motorcycle. The products of combustion flow though the pipe and are discharged at the rear of the motorcycle. As is well known, portions of the exhaust pipe can become quite hot during engine operation. As such, many motorcycles include a thermal shield that covers all, or a portion of the exhaust pipes.

Many motorcycles also include foot pegs or other foot resting or foot actuated devices disposed near the exhaust pipes. The foot pegs provide a place for the rider to position his or her feet while riding the motorcycle. However, the proximity of the foot pegs to the exhaust pipes make it possible for a rider to place a foot or a portion of a foot on the exhaust pipe or the thermal shield. This can scratch, dent, or otherwise damage the thermal shield or the exhaust pipe.

SUMMARY

The present invention provides a heel rest for a motorcycle that attaches directly to an exhaust pipe. The heel rest includes a mounting base that is connected (e.g., welded) to the exhaust pipe and that includes two bosses. Fasteners attach a heel pad to the bosses. To inhibit heat transfer between the exhaust pipe and the heel pad, the heel rest includes an insulating member. In one embodiment, the insulating member includes a first insulator positioned between the heel pad and one of the bosses, and a second insulator positioned between the heel pad and the second boss. Each of the insulators preferably includes a substantially annular component formed substantially from a thermally insulative material such as, but not limited to, a plastic or a ceramic. When used with an exhaust system having a thermal shield, the bosses extend through an aperture in the thermal shield and define attachment points for a heel pad.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
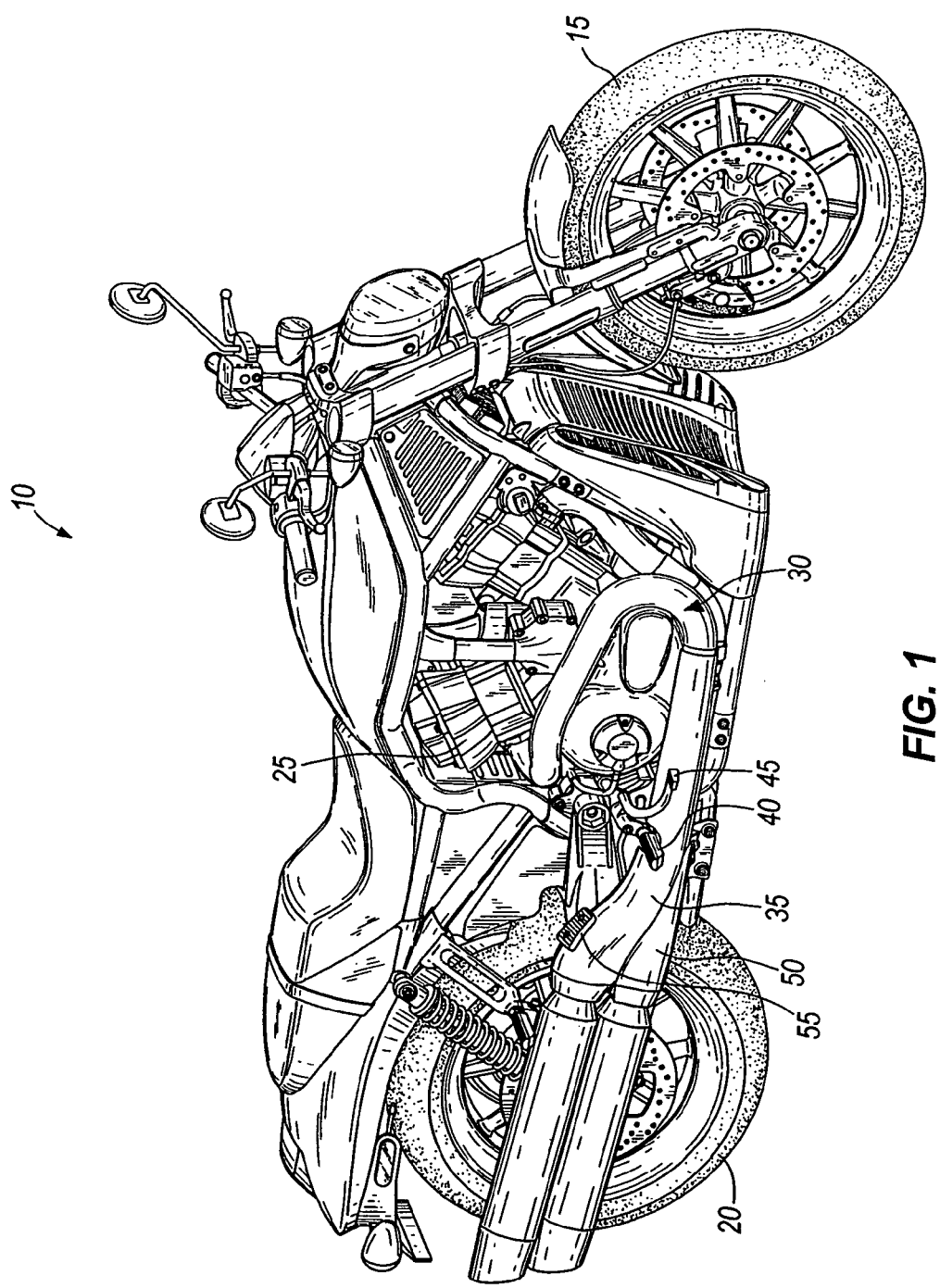
FIG. 1 is a perspective view of a motorcycle including a heel rest embodying the present invention.

FIG. 1 illustrates a motorcycle 10 that includes a front wheel 15, a rear wheel 20, an engine 25, and an exhaust system 30. The engine 25 combusts a fuel-air mixture to produce usable shaft power that in turn drives the rear wheel 20 to propel the motorcycle 10. The combustion process also produces a flow of products of combustion that is directed out of the engine 25 by the exhaust system 30. Generally, a spark-ignition internal combustion engine 25 is employed to power the motorcycle 10. However, other constructions may include compression-ignition engines, rotary engines, or other types of engines that combust a fuel to produce usable shaft power.

The exhaust system 30 includes one or more tubes and mufflers arranged to define one or more exhaust pipes 35 that direct the products of combustion from the engine 25 to a discharge point near the rear of the motorcycle 10. The hot products of combustion pass through the pipes 35 and heat portions of them to relatively high temperatures. As such, the pipes 35 are arranged such that they are positioned in areas not commonly occupied by the rider or riders of the motorcycle 10. For example, much of the pipes 35 are positioned low on the motorcycle 10, below the feet of the rider. Foot rests and foot controls (e.g., pegs 40, foot boards, brake levers 45, shift levers, and the like) are generally positioned above the pipes 35 to reduce the likelihood of contact between the rider and the pipes 35. In addition, a thermal shield 50 may be positioned around the pipes 35 in areas where riders are most likely to contact the pipes 35, in areas that are heated to particularly high temperatures, or in areas where the thermal shield 50 improves the aesthetic appearance of the motorcycle.

In one riding position, the rider's heel may contact the thermal shield 50 that surrounds portions of the exhaust pipes 35. As shown in FIG. 1, a heel rest 55 is positioned on the exhaust pipe 35 at the position of the rider's heel when riding in this position. The heel rest 55 reduces the likelihood of damage to the thermal shield 50 during operation of the motorcycle 10. The heel rest 55 illustrated in FIGS. 3 and 4 includes a mounting base 60, an insulating member 65, a heel pad 70, and one or more fasteners 75.

The mounting base 60 attaches directly to the exhaust pipe 35 and provides a rigid attachment point for the remaining components of the heel rest 55. The mounting base 60 includes an attachment portion 80 that may be contoured to accommodate attachment to the pipe 35. Generally, the contour of the attachment portion 80 matches the contour of the exhaust pipe 35 in the location to which the mounting base 60 is attached. Of course other constructions may employ a flat attachment portion 80 to simplify manufacturing.

Preferred constructions employ a welding or brazing process to attach the mounting base 60 to the exhaust pipe 35, with other attachment means being possible. For example, one construction employs fasteners to attach the mounting base 60 to the exhaust pipe 35. However, fasteners will generally require one or more holes that pass through the wall of the exhaust pipe 35. As such, seal members may be required to inhibit leakage of hot products of combustion from the exhaust pipe 35. In still other constructions, high-temperature adhesives may be employed to complete the attachment of the mounting base 60 to the exhaust pipe 35. The actual method used to attach the mounting base 60 to the exhaust pipe 35 is not critical, so long as the attachment can be maintained at the high operating temperatures normally experienced by the exhaust pipe 35 at the attachment location. It should be noted that the preferred welding or brazing processes are generally only suitable for use with mounting bases 60 that are metallic. Of course, other constructions may employ other materials (e.g., composite, ceramic, plastic, etc.) for the mounting base 60. The attachment method employed would have to be tailored to the material being used for the mounting base 60 and the exhaust pipe 35. For example, a composite mounting base would likely not be weldable and would attach using fasteners, adhesives, or other suitable fastening means.

Figure 3:
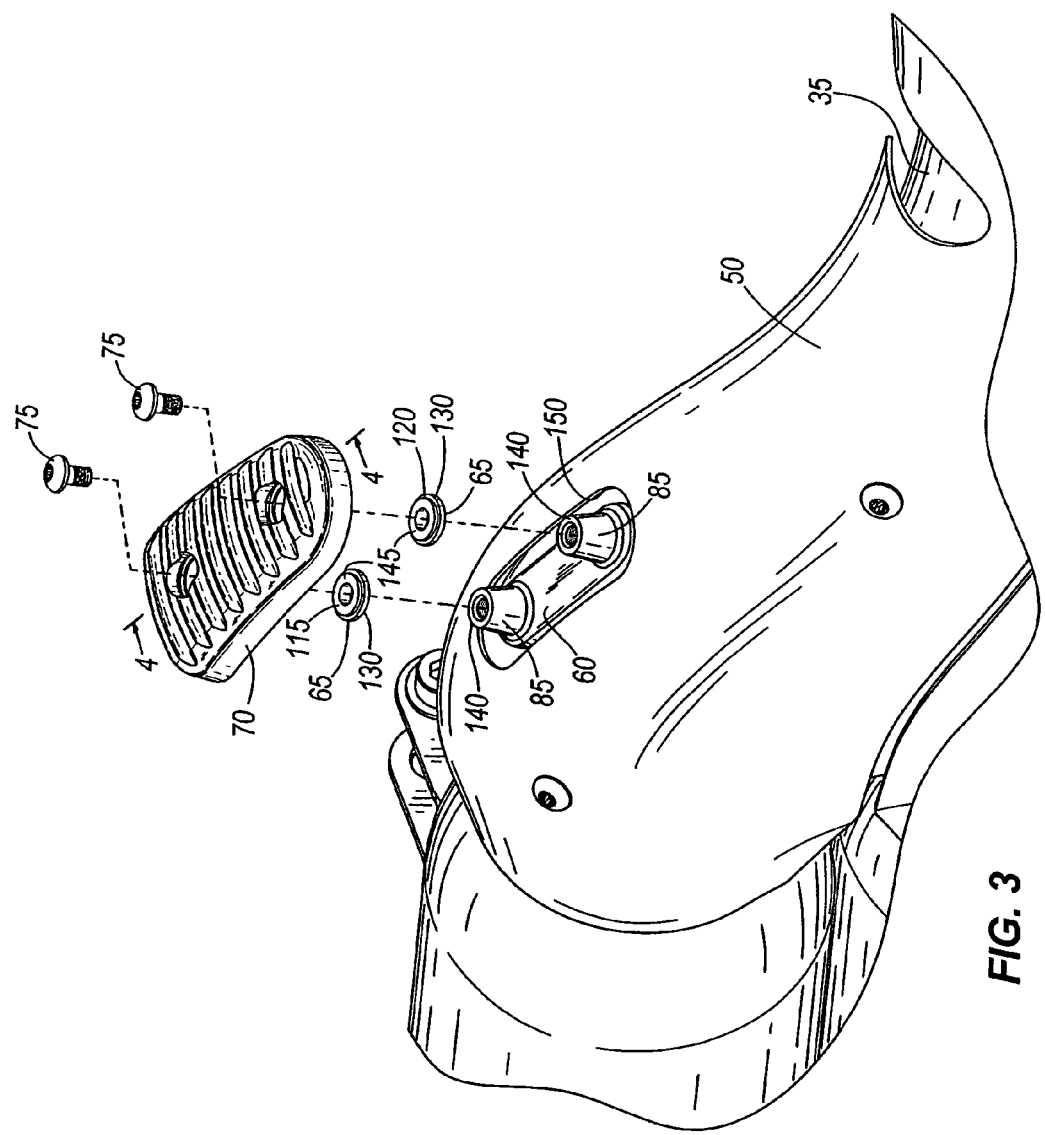
FIG. 3 is an exploded perspective view of the heel rest of FIG. 1.

The mounting base 60 also includes two mounting bosses 85 that extend from the attachment portion 80. In the construction illustrated in FIGS. 3 and 4, the bosses 85 are frustoconical with other shapes (e.g., cylindrical, cubical, extruded polygonal shapes, and the like) also being suitable for use. As shown in FIG. 3, a bore 90 extends into each of the bosses 85 and includes threads 95 that receive one of the fasteners 75. Before proceeding, it should be noted that while two fasteners 75, and two mounting bosses 85 having two bores 90, have been described herein, other constructions may employ only one fastener 75, or more than two fasteners 75. The number of bosses 85 generally matches the number of fasteners 75 employed. In other constructions, each boss 85 receives one or more fasteners 75 and/or additional bosses 85 are provided to support the heel pad 70 but do not receive fasteners 75. In still other constructions, fasteners 75 are not used and other attachment means (e.g., mushroom head and slots, and the like) are employed.

Figure 2:
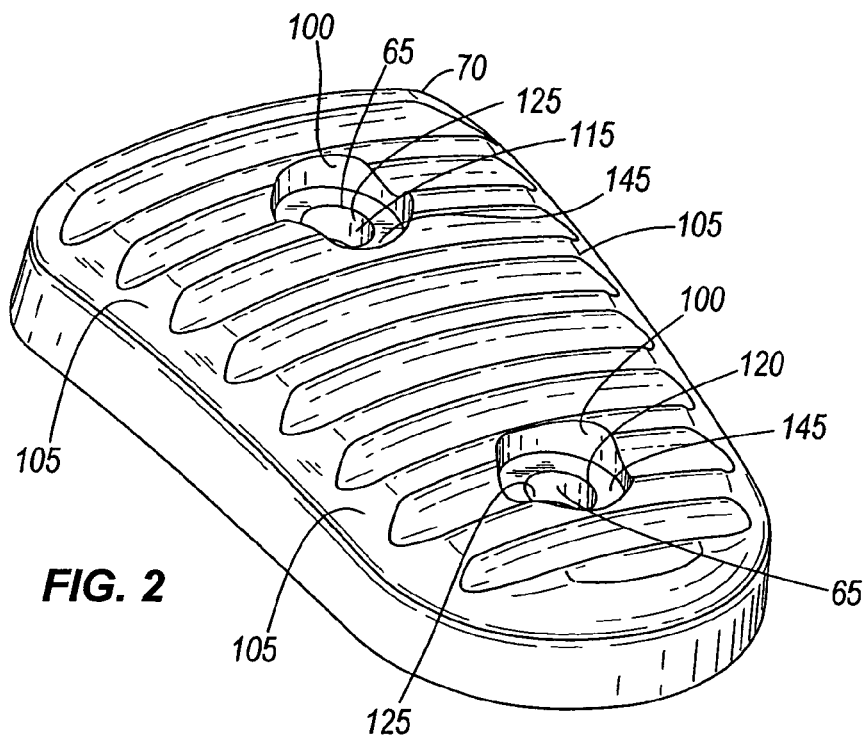
FIG. 2 is an enlarged perspective view of the heel pad of FIG. 1.

The heel pad 70 illustrated in FIGS. 2 and 3 includes two bores 100 and a plurality of ridges 105 positioned to engage the rider's heel. While ridges 105 are illustrated, one of ordinary skill will realize that there are many other patterns and surface textures that could be employed in conjunction with, or in place of the ridges 105 to provide an engaging surface for the rider's heel. Each bore 100 includes a radially extending groove 110 that extends around the bore 100. A soft plastic or rubber-like material may be used to form the heel pad 70 with other materials also being suitable for use.

The insulating member 65 includes a first insulator 115 and a second insulator 120. The insulators 115, 120 each include a central aperture 125 that extends through the insulator 115, 120 and a tongue 130 that extends radially outward and around the insulator 115, 120 to engage the groove 110 of one of the bores 90 in the heel pad 70. Each insulator 115, 120 defines a first planar surface 135 that rests on a top surface 140 of one of the bosses 85 and a second planar surface 145 that engages the fastener 75. Thus, the insulators 115, 120 are sandwiched between the bosses 85 and the fasteners 75 when the heel rest 55 is assembled. The first insulator 115 and the second insulator 120 each include a thermally-insulating material such as a plastic, a ceramic, or a composite, with other materials also being possible. While the illustrated insulators 115, 120 are substantially annular or washer-shaped, other constructions may use other shaped insulators. In addition, other constructions may employ a single insulating member, or may include multi-piece insulators if desired.

In one construction, the heel pad 70, the first insulator 115, and the second insulator 120 are co-molded from two different types of plastic. Using this process, the first and second insulators 115, 120 can be formed from a material that is relatively firm and rigid, and the heel pad 70 can be molded around the pre-molded insulators from a relatively soft and resilient material. In still other constructions, the components are manufactured separately and the first and second insulators 115, 120 are inserted into the heel pad 70 during the assembly of the heel rest 55.

Figure 4:
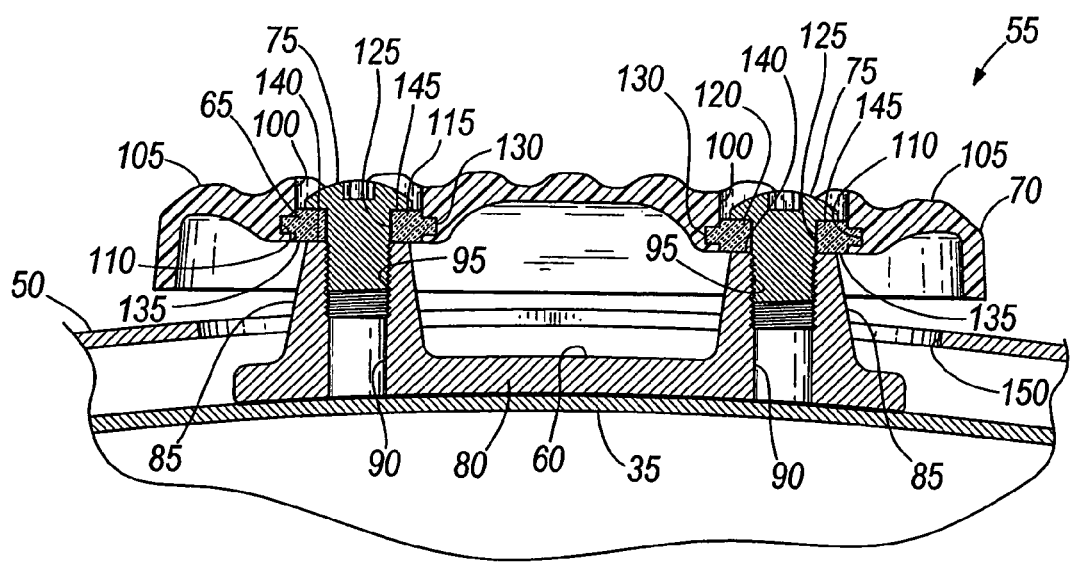
FIG. 4 is a section view of the heel rest taken along line 4—4 of FIG. 3.

As shown in FIGS. 3 and 4, the heel rest 55 attaches to the exhaust pipe 35 in an area that is at least partially surrounded by a thermal shield 50. As such, an aperture 150 or cutout is formed in the thermal shield 50 to provide clearance for the heel rest 55. The mounting base 60 is located at the desired point on the exhaust pipe 35 and is welded into place. Once positioned, the bosses 85 extend through the aperture 150 in the thermal shield 50 such that they are disposed at least partially above the thermal shield 50. The heel pad 70, including the first and second insulators 115, 120, is positioned on top of the bosses 85, and the fasteners 75 are inserted in the central apertures 125 of the insulators 115, 120. The fasteners 75 are tightened to firmly attach the insulators 115, 120 and the heel pad 70 to the bosses 85 and to the exhaust pipe 35. The first and second insulators 115, 120 thermally insulate the mounting base 60 and the fasteners 75 from the heel pad 70.

In operation, the engine 25 discharges hot products of combustion through the exhaust pipe 35. The hot products of combustion heat both the exhaust pipe 35 and the mounting base 60. In most constructions, the mounting base 60 is metallic and thus readily conducts heat into the fasteners 75 (also generally metallic) as they are in direct contact with the mounting base 60. However, the insulative property of the insulators 115, 120 significantly reduces the heat transfer from the fasteners 75 and mounting base 60 to the heel pad 70. Thus, the heel pad 70 remains at a temperature that is substantially lower than the temperature of the exhaust pipe 35 during motorcycle operation.

Thus, the invention provides, among other things, a new and useful heel rest 55 for a motorcycle 10. More particularly, the invention provides a new and useful heel rest 55 that attaches to the exhaust pipe 35 of the motorcycle 10 but that is thermally insulated from the exhaust pipe 35. Various features and advantages of the invention are set forth in the following claims.

What is claimed is:

1. A heel rest for a motorcycle having an exhaust pipe, the heel rest comprising:
    a mounting base adapted to connect to the exhaust pipe;
    a heel pad coupled to the mounting base; and
    an insulating member disposed between the heel pad and the mounting base to inhibit heat transfer between the heel pad and the mounting base, wherein the mounting base includes a first boss adapted to receive a first fastener and a second boss adapted to receive a second fastener, and wherein the insulating member includes a first insulator disposed between the heel rest and the first boss and a second insulator disposed between the heel rest and the second boss.

2. The heel rest of claim 1, wherein the mounting base includes a curved portion adapted to engage the exhaust pipe.

3. The heel rest of claim 1, wherein the heel pad includes a first aperture sized to receive the first fastener and a second aperture sized to receive the second fastener.

4. The heel rest of claim 1, wherein the insulating member includes a plastic material.

5. The heel rest of claim 1, wherein the insulating member includes a ceramic material.

6. A motorcycle comprising:
an exhaust pipe; and
a heel rest including:
   a mounting base coupled to the exhaust pipe;
   a heel pad coupled to the mounting base; and
   an insulating member disposed between the heel pad and the mounting base to inhibit heat transfer between the heel pad and the mounting base.

7. The motorcycle of claim 6, further comprising a thermal shield disposed adjacent the exhaust pipe, the thermal shield defining an aperture.

8. The motorcycle of claim 7, wherein at least a portion of the mounting base extends through the aperture.

9. The motorcycle of claim 6, wherein the mounting base is welded to the exhaust pipe.

10. The motorcycle of claim 9, wherein the mounting base includes a first boss and a second boss, and wherein at least a portion of the first boss and the second boss extend through the aperture.

11. The motorcycle of claim 10, wherein the insulating member includes a first insulator disposed between the heel rest and the first boss and a second insulator disposed between the heel rest and the second boss.

12. The motorcycle of claim 6, wherein the insulating member includes a plastic material.

13. The motorcycle of claim 6, wherein the insulating member includes a ceramic material.

14. The motorcycle of claim 6, wherein the mounting base includes a curved portion adapted to engage the exhaust pipe.

15. A heel rest for a motorcycle having an exhaust pipe, the heel rest comprising:
a heel pad including a top surface and a bottom surface, the top surface contoured to engage a heel, the heel pad adapted to be coupled to the exhaust pipe; and
an insulating member coupled to the heel pad to inhibit heat transfer between the exhaust pipe and the heel pad, wherein the heel pad includes an aperture that extends from the top surface to the bottom surface, and wherein the insulating member is at least partially disposed within the aperture.

16. The heel rest of claim 15, wherein the aperture includes one of a tongue and a groove and the insulating member includes the other of the tongue and the groove.

17. The heel rest of claim 15, wherein the heel pad includes a plurality of apertures that extend from the top surface to the bottom surface.

18. The heel rest of claim 17, wherein the insulating member includes a plurality of insulators, each insulator at least partially disposed within one of the plurality of apertures.

19. The heel rest of claim 15, wherein the heel pad and the insulating member are co-molded.

20. The heel rest of claim 19, wherein the heel pad and the insulating member are made from different materials.

21. The heel rest of claim 15, wherein the contoured top surface includes a plurality of substantially parallel ridges.

22. A heel rest for a motorcycle having an exhaust pipe and a mounting base coupled to the exhaust pipe, the heel rest comprising: a heel pad including a top surface and a bottom surface, the top surface contoured to engage a heel;
and an insulating member coupled to the heel pad, the insulating member configured to be coupled between the heel pad and the mounting base to inhibit heat transfer between the exhaust pipe and the heel pad, wherein the heel pad and the insulating member are made from different materials.

* * * * *